UNITED STATES PATENT OFFICE.

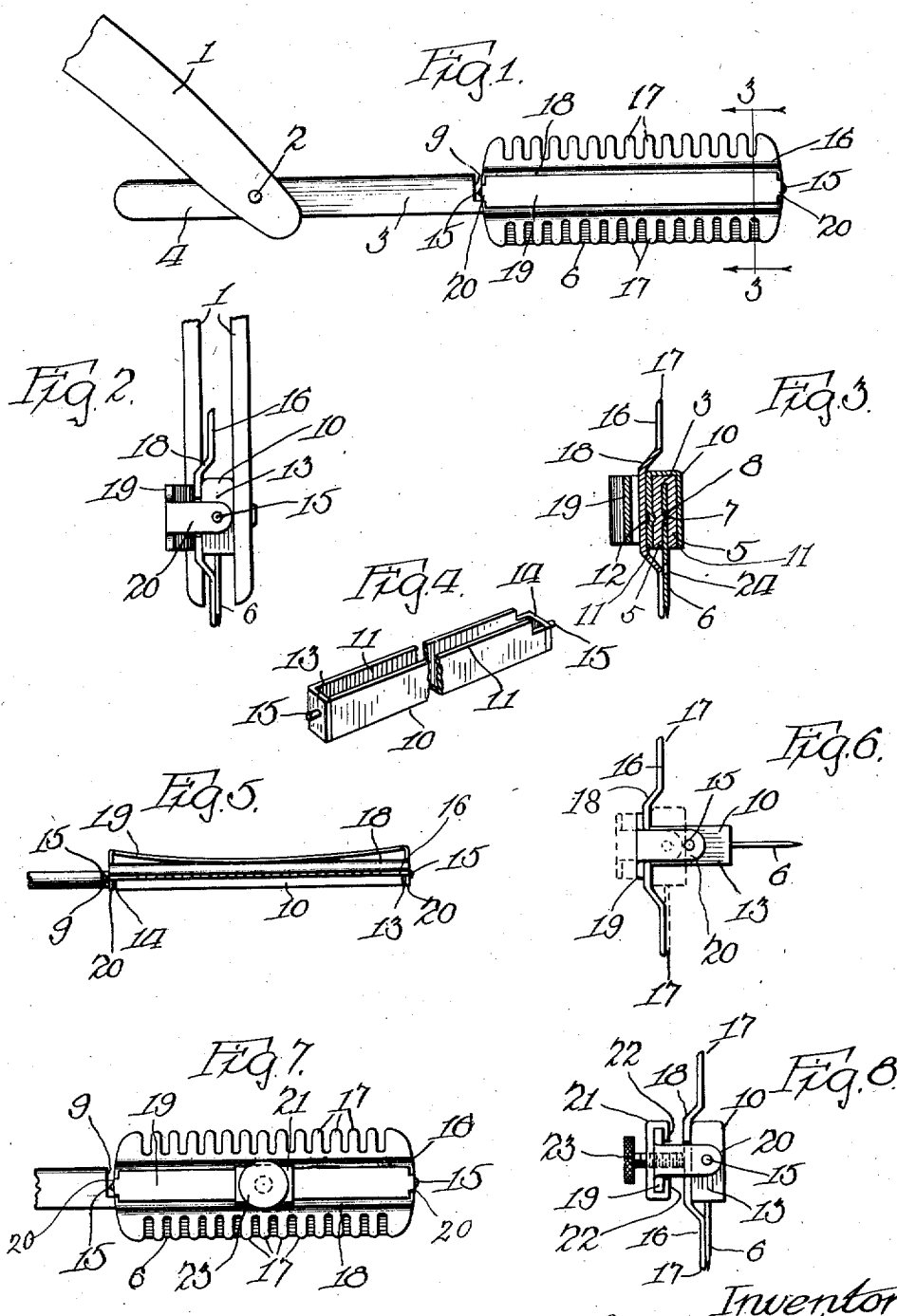
R. P. NEIL.
SAFETY RAZOR.
APPLICATION FILED AUG. 12, 1918.
1,298,772.
Patented Apr. 1, 1919.

ROBERT P. NEIL, OF CALUMET, MICHIGAN.

SAFETY-RAZOR.

1,298,772.   Specification of Letters Patent.   Patented Apr. 1, 1919.

Application filed August 12, 1918. Serial No. 249,443.

*To all whom it may concern:*

Be it known that I, ROBERT P. NEIL, a citizen of the United States, residing at Calumet, in the county of Houghton and State of Michigan, have invented certain new and useful Improvements in Safety-Razors, of which the following is a specification, reference being had to the accompanying drawings, forming a part of this specification, in which corresponding numerals of reference in the different figures indicate like parts.

The object of my invention is to provide a simple, cheap and effective safety-razor, in which the blades may be rendered interchangeable and when in place may be readily adjusted for right or left-hand use as a result of a rotative reversing action of the blade-holding frame with relation to the guard, and when so reversed, may be yieldingly held in one of the two extreme positions with respect to the guard or shield without the necessity of removing the blade. A further object is to permit the shield to be removed to enable the blade to be honed,— all of which is hereinafter more fully described and definitely pointed out in the claims.

In the drawings, Figure 1, is a side elevation of a safety razor embodying the features of my invention, Fig. 2, is a forward end view thereof greatly enlarged, Fig. 3, is a section taken upon the line 3—3, Fig. 1, viewed in the direction of the arrows, Fig. 4, is a perspective of the case for receiving the blade-holder,

Fig. 5, is a plan,

Fig. 6, is an end elevation as it would appear when the blade is partly shifted from one extreme position to another, Fig. 7, is a side elevation of a modified construction, and Fig. 8, is an end elevation thereof.

Referring to the drawings, 1, Figs. 1 and 2, indicates an ordinary razor handle pivoted at 2 to a blade-holding member generally designated by 3, the rear portion 4, of which forms the tang, while the forward part is intended to hold the blade. The member 3 is preferably formed from sheet-metal bent so as to appear U-shaped in cross-section having parallel walls 5, 5, Fig. 3, spaced apart, for the reception of a blade 6, a portion of which is inserted between said walls. Said blade is so gaged with respect to the receiving space as to require gentle pressure to place it in position, but, I prefer to form perforations 7, one of which is shown in Fig. 3, therein, so as to be frictionally engaged by slight registering indentations 8 formed in one of the walls 5 of the blade. The blade-holding member 3 is provided with a transverse notch 9, cut inwardly from the back, at a distance from the forward end corresponding substantially to the length of the blade. In the preferable construction, that portion of said blade-holder extending from the notch 9 to the forward end, has its back, sides and ends inclosed within a removable sheet-metal box-like casing generally designated by 10, best shown in Fig. 4, the side-walls 11, 11, of which are caused to fit in close frictional contact with the walls 5 of said blade-holder; one of said walls 11, being provided with indentations 12, Fig. 3, adapted to register with the indentations 8 in one of the walls 5, so as to yieldingly hold the blade-holder in place within said casing. Each of the end-walls 13 and 14 is provided with an outwardly-extended pivot-pin 15, for the purpose hereinafter stated. A shield or guard generally designated by 16, is placed adjacent to the casing 10. Said guard is provided with the usual serrations 17 upon opposite edges and a longitudinal off-set portion 18, so as to form a channel or depression for the reception of the casing 10, the width of said channel being such as to correspond substantially to that of the side walls of the casing so that one or the other of the latter may be caused to lie therein in the manner shown. The depth of the channel should be such that when the casing is in its normal position, the inner face of the guard may be held in direct contact with that of the blade 6.

In order to hold the guard and casing 10 in operative relation to each other so as to provide for a reversal of the blade with respect to the guard, it is necessary to do so with a yielding pressure while providing for sufficient lateral play to enable the casing to be rotated upon a longitudinal axis, the degree of eccentricity of the back being considered. This may be accomplished preferably by means of a bent flat spring 19, corresponding in length substantially to that of the casing 10. Said spring is provided with lugs 20, 20, upon its ends bent laterally in the same direction and having openings therein for the reception of the pivot-pins 15. The end wall 14, of the casing 10 is cut away as shown in Fig. 4, so as to enter the notch 9, thereby enabling the casing to inclose the blade-holding member. When the spring 19 is in place with the lugs 20 in engagement with the pivot-pins 15, the spring should be under tension. The middle portion thereof will then be in contact with the outer face of the guard 16 midway between the ends and will have the effect to hold the casing 10 in the channel of the guard with a yielding pressure. Upon holding the guard with one hand and grasping the shank of the blade-holder with the other, the user may readily rotate the latter so as to shift the blade 6, through a half revolution from one extreme position to another and adjust it against one or the other edge of the guard according as may be desired, for right or left-hand use. In Fig. 6, the parts are shown as they would appear when a quarter turn of the casing is made. In this position it will be noted that the spring 19 is bent from its normal position so that the end portions are in substantial contact with the outer face of the guard. The adjustment should be such that the back of the casing 10, which is eccentric to the axis 15, may be free to be turned in sliding contact with the inner face of the guard.

It is desirable that the spring 19 should be under sufficient normal tension to hold the blade against the guard. In Figs. 7 and 8, I have shown a means for increasing the tension if required. A clamp 21, having inturned flanges 22, 22, is placed upon the spring 19 midway between the ends. A thumb-screw 23 is tapped through said clamp and passed loosely through a hole in the spring so that the end of the screw will be in contact with the outer face of the guard-member. Upon adjusting the screw any desired tension may be placed upon the spring.

In order to readily remove the blades, I provide one or more perforations 24, Fig. 3, into which any suitable instrument may be inserted to accomplish such removal. I do not, however, intend to be confined to the use of interchangeable blades, inasmuch as the blade-holder with the blade therein, may be readily removed from the casing 10 by placing the latter in the position shown in Fig. 6, holding the guard rigidly and exerting pressure upon the shank of the blade-holder in a direction at right angles to the plane of the guard. When thus removed, the blade may be stropped like that of an ordinary razor.

The object of the casing 10 is to permit such removal; otherwise the casing might be dispensed with. I do not wish to be limited to the exact construction shown in this or other respects inasmuch as it may be varied without departing from the spirit of the invention.

Having thus described my invention, I claim:—

1. A safety razor comprising, in combination, a shank extending longitudinally of the blade, a blade-holder, a guard, means for pivotally mounting said blade-holder against one face of said guard upon a longitudinal axis substantially coincident with that of the shank to permit a half revolution of the holder when the shank is rotated and the guard held against rotation and resilient means located upon the opposite side of said guard from said holder and in operative connection with said holder to yieldingly press the two together.

2. A safety razor comprising, in combination, a blade, a blade-holder, a shank extending longitudinally of the blade, a guard, means for pivotally mounting said blade-holder against one face of said guard upon a longitudinal axis substantially coincident with that of the shank to permit a half revolution of the holder when the shank is rotated and the guard held against rotation, means for maintaining said guard with its opposite edges equidistant from the plane of the axis of said holder and resilient means located upon the opposite side of said guard from said holder and in operative connection with the latter to yieldingly maintain said holder in normal parallel relation to the face of said blade.

3. A safety razor, comprising, in combination, a blade, a blade-holder having a shank, said holder being formed to receive said blade between parallel walls, a spring arranged longitudinally of said holder in substantial parallelism therewith and having laterally extended lugs, a casing for receiving said holder provided with oppositely extended pivot-pins for entering openings in said lugs and a guard having teeth upon opposite edges thereof, said guard being interposed between said casing and spring.

4. A safety razor comprising, in combination, a blade, a blade-holder having a longitudinal recess therein for the reception of a blade, said holder having a notch extending inwardly from the back thereof to receive an end flange of a casing for said blade-holder, a casing for receiving said blade-holder provided with pivot-pins at its ends, a guard arranged adjacent to said casing provided with teeth upon opposite edges and yielding means upon the outside of said guard for engaging said pivot pins to hold said guard against the blade with a yielding pressure while permitting said blade-holder and casing to be rotatively shifted from one to another extreme position.

5. A safety razor comprising, in combination, a blade, a blade-holder formed to receive said blade between parallel walls, a spring extended longitudinally of said holder in substantial parallelism therewith, means for pivotally connecting the ends of said spring with said holder to permit of a partial rotation of the latter upon a longitudinal axis, a guard serrated upon opposite edges, interposed between the body of said spring and that of holder, said spring serving to normally press the guard and holder together in yielding relation to each other and means for varying the tension of said spring.

In witness whereof, I have signed this specification in the presence of two subscribing witnesses this sixth day of August, 1918.

ROBERT P. NEIL.

Witnesses:
J. J. WILSON,
W. HARDING.